(12) United States Patent
Abreu et al.

(10) Patent No.: US 8,024,934 B2
(45) Date of Patent: Sep. 27, 2011

(54) SYSTEM AND METHOD FOR ATTENUATING COMBUSTION OSCILLATIONS IN A GAS TURBINE ENGINE

(75) Inventors: Mario E. Abreu, Poway, CA (US);
Gwenn A. Peters, San Diego, CA (US);
Terry R. Tarver, Ramona, CA (US);
Chris Z. Twardochleb, Alpine, CA (US); James W. Blust, San Diego, CA (US)

(73) Assignee: Solar Turbines Inc., San Diego, CA (US)

(*) Notice: Subject to any disclaimer, the term of this patent is extended or adjusted under 35 U.S.C. 154(b) by 1013 days.

(21) Appl. No.: 11/506,328

(22) Filed: Aug. 18, 2006

(65) Prior Publication Data

US 2007/0039329 A1    Feb. 22, 2007

Related U.S. Application Data

(60) Provisional application No. 60/710,116, filed on Aug. 22, 2005.

(51) Int. Cl.
*F02C 7/22* (2006.01)

(52) U.S. Cl. ........................ 60/776; 60/39.281

(58) Field of Classification Search ............... 60/39.091, 60/39.281, 725, 776, 779
See application file for complete search history.

(56) References Cited

U.S. PATENT DOCUMENTS

| | | | |
|---|---|---|---|
| 5,685,157 A | 11/1997 | Pandalai et al. | |
| 5,791,889 A * | 8/1998 | Gemmen et al. | 431/1 |
| 5,809,769 A * | 9/1998 | Richards et al. | 60/776 |
| 6,205,764 B1 * | 3/2001 | Hermann et al. | 60/776 |
| 6,314,716 B1 | 11/2001 | Abreu et al. | |
| 6,430,933 B1 | 8/2002 | Keller | |
| 6,560,967 B1 * | 5/2003 | Cohen et al. | 60/776 |
| 6,634,457 B2 | 10/2003 | Paschereit et al. | |
| 6,742,341 B2 * | 6/2004 | Ryan et al. | 60/773 |
| 6,971,242 B2 | 12/2005 | Boardman | |
| 6,973,791 B2 | 12/2005 | Handelsman et al. | |

* cited by examiner

*Primary Examiner* — Louis Casaregola
*Assistant Examiner* — Phutthiwat Wongwian
(74) *Attorney, Agent, or Firm* — Kevin Earle

(57) ABSTRACT

A system and method for modifying the supply of fuel to injectors to attenuate combustion oscillations in a gas turbine engine. The gas turbine engine may comprise a combustor, a plurality of injectors and a manifold. The plurality of injectors may be operable to provide fuel to the combustor. The manifold may be configured to supply fuel to all of the plurality of injectors or to only a portion of the plurality of injectors in reaction to a determination of an existence of combustion oscillations.

7 Claims, 7 Drawing Sheets

Fig-6-

SYSTEM AND METHOD FOR ATTENUATING COMBUSTION OSCILLATIONS IN A GAS TURBINE ENGINE

RELATION TO OTHER PATENT

This application claims the benefit of prior provisional patent application Ser. No. 60/710,116, filed Aug. 22, 2005.

TECHNICAL FIELD

The present disclosure relates generally to attenuating combustion oscillations in gas turbine engines, and more specifically to a system and method of modifying the supply of fuel to injectors to attenuate combustion oscillations.

BACKGROUND

Producers of gas turbine engines have made great strides in reducing regulated emissions such as NOx. However, these strides have led to various instabilities in combustion, such as combustor thermo-acoustic oscillations. This problem may be brought about by the coupling of the heat release and pressure waves, which produce a resonance with a characteristic frequency usually corresponding to one or more natural frequencies of the combustion chamber. This has been historically described by the well-known Rayleigh Mechanism. Such oscillations in the combustor may result in mechanical and thermal fatigue to combustor hardware which may lead to other operational problems that may have adverse affects on the engine.

Several attempts have been made to eliminate, diminish or prevent thermo-acoustic oscillations. One such attempt to attenuating oscillations was to decouple the heat release form the pressure wave by moving the fuel introduction point in the injector so that the residence time to the flame was different than that required to sustain resonant oscillations. This may be accomplished by moving the fuel spokes along the length of the injector main fuel and air flow path.

Another attempt to attenuate oscillations was to introduce airflow in a row of holes around the circumference of the injector barrel. The axial location of the row of holes along the barrel was determined so as to dilute the fuel to air ratio in an attempt to provide a non-sinusoidal variation in the energy input to the flame. However, problems with such attempts has been in the limited number of frequencies of oscillations that could be attenuated. Unfortunately, some engines exhibit more than one frequency of oscillation when they are at different power settings.

The system and method of the present disclosure is set forth to overcome at least one of the problems described above.

SUMMARY OF THE INVENTION

It is to be understood that both the foregoing general description and the following detailed description are exemplary and explanatory only and are not restrictive of the invention as claimed.

In one aspect of the present disclosure, a gas turbine engine is disclosed. The gas turbine engine comprises a combustor, a plurality of injectors and a manifold. The plurality of injectors may be operable to provide fuel to the combustor. The manifold may be configured to supply fuel to all of the plurality of injectors or to only a portion of the plurality of injectors in reaction to a determination of an existence of combustion oscillations.

In another aspect of the present disclosure, a method of controlling combustion oscillations on a gas turbine engine is disclosed. The method may comprise the steps of determining an existence of a combustion oscillation and preventing fuel to at least one of a plurality of injectors.

In another aspect of the present disclosure, a system for controlling fuel delivery is disclosed. The system comprises a sensor, a manifold and at least one valve. The sensor may be configured to determine an existence of combustion oscillations. The manifold may be configured to supply fuel to all of a plurality of injectors or to only a portion of the plurality of injectors. The at least one valve may be operable to control fuel to at least a portion of the manifold in reaction to the determination of the existence of combustion oscillations.

In another aspect of the present disclosure, a method of attenuating combustion oscillations is disclosed. The method may comprise the steps of determining an existence of a combustion oscillation within a combustion system and controlling the combustion oscillations by creating a non-homogenous temperature condition within a combustion zone of the combustion system.

BRIEF DESCRIPTION OF THE DRAWINGS

The accompanying drawings, which are incorporated in and constitute a part of this specification, illustrate embodiments of the invention and, together with the description, serve to explain the principles of the invention. In the drawings.

DETAILED DESCRIPTION

Reference will now be made in detail to embodiments of the invention, examples of which are illustrated in the accompanying drawings. Whenever possible, the same reference numbers will be used throughout the drawings to refer to the same or like parts.

Figure 1:
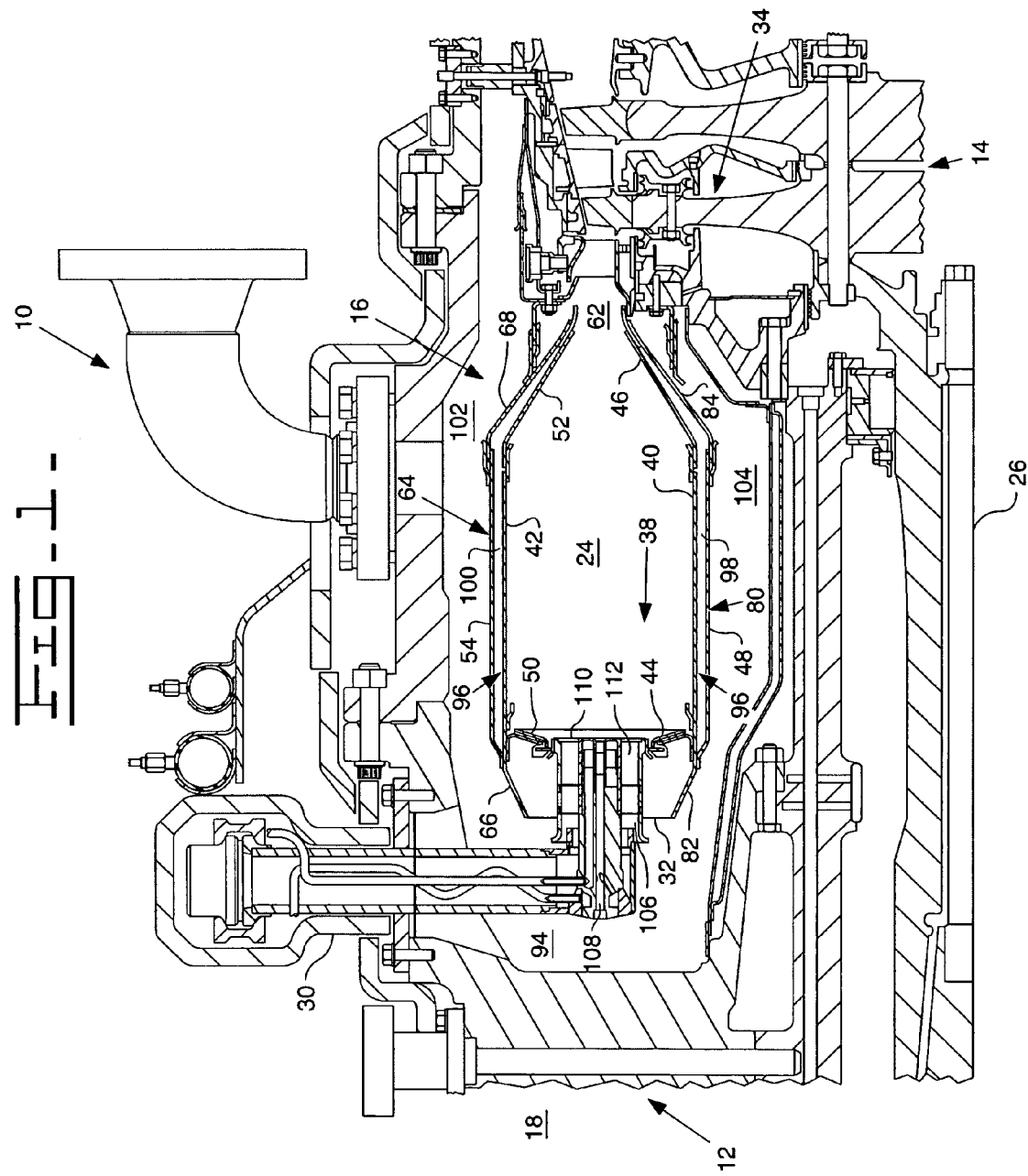
FIG. 1 illustrates a cross-sectional view of a gas turbine engine with a combustor and injector.

Referring to FIG. 1, a gas turbine engine 10 is shown, but not in its entirety. The gas turbine engine 10 includes an airflow delivery system 12 for providing combustion air and for providing cooling air for cooling components for the engine 10. The engine 10 includes a turbine section 14, a combustor section 16 and the compressor section 18 operatively connected to the turbine section 14. In this application the combustor section 16 includes an annular combustion chamber 24 positioned about a central axis 26 of the gas turbine engine 10. As an alternative, the engine 10 could include a plurality of can combustors without changing the essence of the invention. The annular combustion chamber 24 is operatively positioned between the compressor section 18 and the turbine section 14. A plurality of fuel injectors 30 (one shown) are positioned in an inlet end portion 32 of the annular combustion chamber 24. The turbine section 14 includes a first stage turbine 34 being centered about the central axis 26.

An annular combustion zone 38 is enclosed by an inner combustor liner 40 and an outer combustor liner 42 spaced apart a predetermined distance. The inner combustor liner 40 has an inner inlet conical portion 44 and an inner outlet conical portion 46 axially spaced apart by an inner cylindrical liner portion 48. The inner inlet conical portion 44 connects with fuel injector 30 in a normal fashion. The inner outlet conical portion 46 terminates proximate the turbine section 14. While the combustor liners 40 and 42 are shown having multiple pieces, the combustor liners 40 and 42 may also be made from a single piece of conventional high-temperature material without changing the essence of the invention.

Similarly the outer combustor liner 42 has an outer inlet conical portion 50 and an outer outlet conical portion 52 axially spaced apart by an outer cylindrical liner portion 54. The outer inlet conical portion 50 connects in a normal fashion with the fuel injector 30. The outer outlet conical portion 52 terminates proximate the turbine section 14. The outer outlet conical portion 52 and the inner outlet conical portion 46 define a combustor outlet nozzle 62. The combustor outlet nozzle 62 fluidly connects with the turbine section 14.

An outer cooling shield 64 surrounds the outer cylindrical liner portion 54. The outer cooling shield 64 has a first outer shield portion 66 separated axially from a second outer shield portion 68. Similarly, an inner cooling shield 80 has a first inner shield portion 82 axially separated from a second inner shield portion 84. The outer cylindrical liner portion 54 and the outer cooling shield 64, and the second inner shield portion 84 and the inner cooling shield 80 define cooling air plenums 96 for the annular combustion chamber 24. A combustion air plenum 94 encircles the annular combustor.

The cooling air plenums 96 fluidly connect with the combustion air plenum 94 through an inner cooling air passage 98 and an outer cooling air passage 100. An outer air passage 102 and inner air passage 104 fluidly connect with the air flow delivery system 12. The outer air passage 102 and the outer cooling air passage 100 fluidly connect through a plurality of impingement holes (not shown) in the outer cooling shield 64. Likewise, the plurality of impingement holes fluidly connects the inner cooling air passage 98 with the inner air passage 104.

Figure 2:
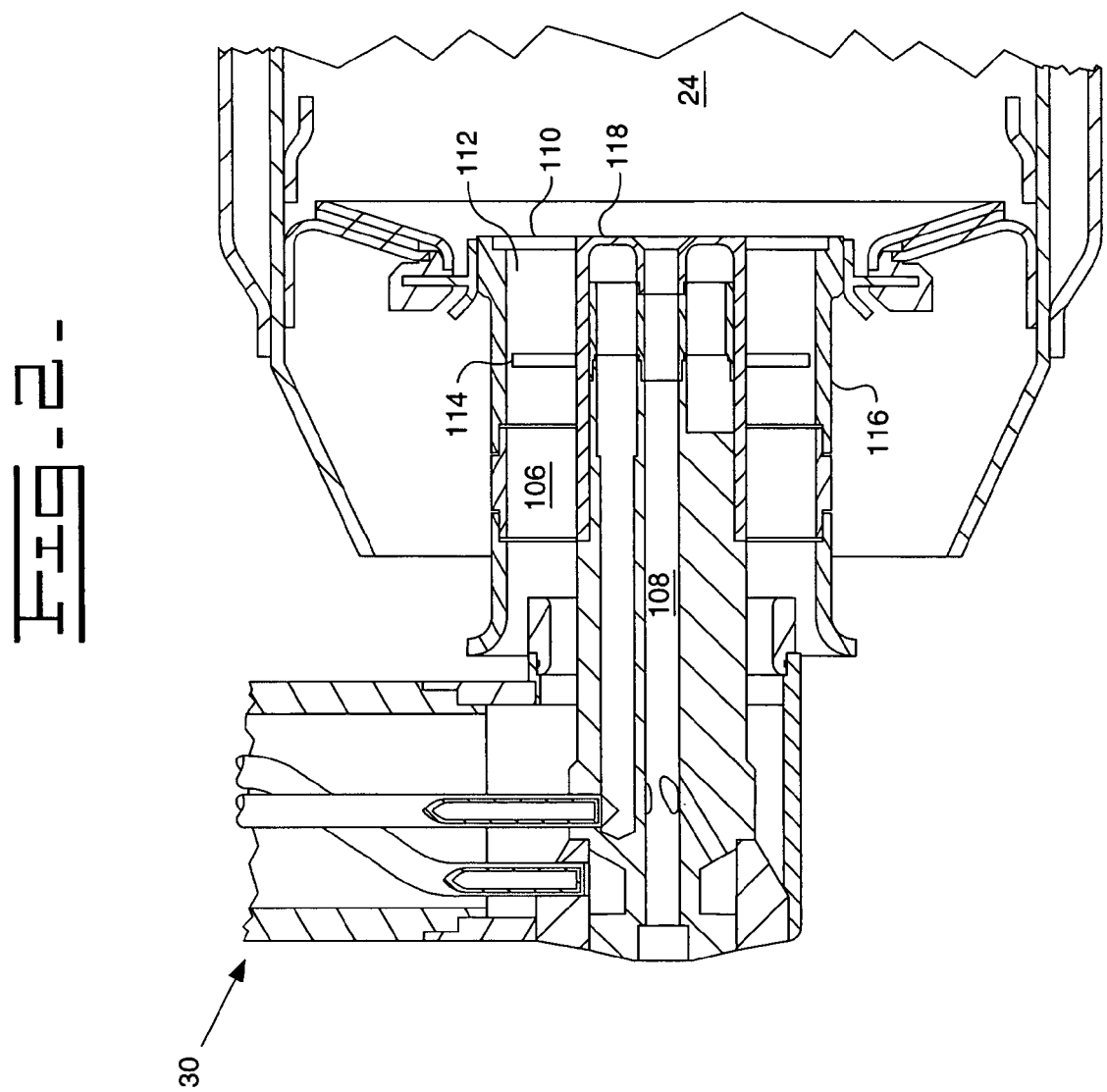
FIG. 2 illustrates a typical combustor/injector configuration.

Referring now to FIG. 2, a fuel injector 30 is shown. The fuel injector 30 includes a plurality of passages and a swirler 106. The passages direct air and fuel into the annular combustion chamber 24. Pilot fuel and pilot air mix in a pilot passage 108 and exit through a front side 110 of the fuel injector 30. Additional fuel is added in a premix duct 112 of the fuel injector 30 through orifices 114 in axial alignment with the swirler 106. The premix duct 112 is an annular passage between an outer barrel 116 of the fuel injector 30 and a center body 118, downstream of the swirler 106, in which fuel and air are given ample space and time to mix. Air entering into the fuel injector 30 passes through the swirler 106 and collects fuel provided through the orifices 114. The swirler 106 features ten axial vanes spanning from the center body 118 to the outer barrel 116, designed to impose a forced vortex to the air and fuel flow within the premix duct 112. The air and fuel mix and enter the annular combustor chamber 24 where they ignite.

Initially, a pilot flame (not shown) in the annular combustion chamber 24 may be stable, or in other words, the combustion may not be producing undesirable oscillations. Combustion driven oscillations are likely when the changes in heat release are in phase or partial phase with the acoustic pressure disturbances in the combustion chamber 24.

Figure 3:
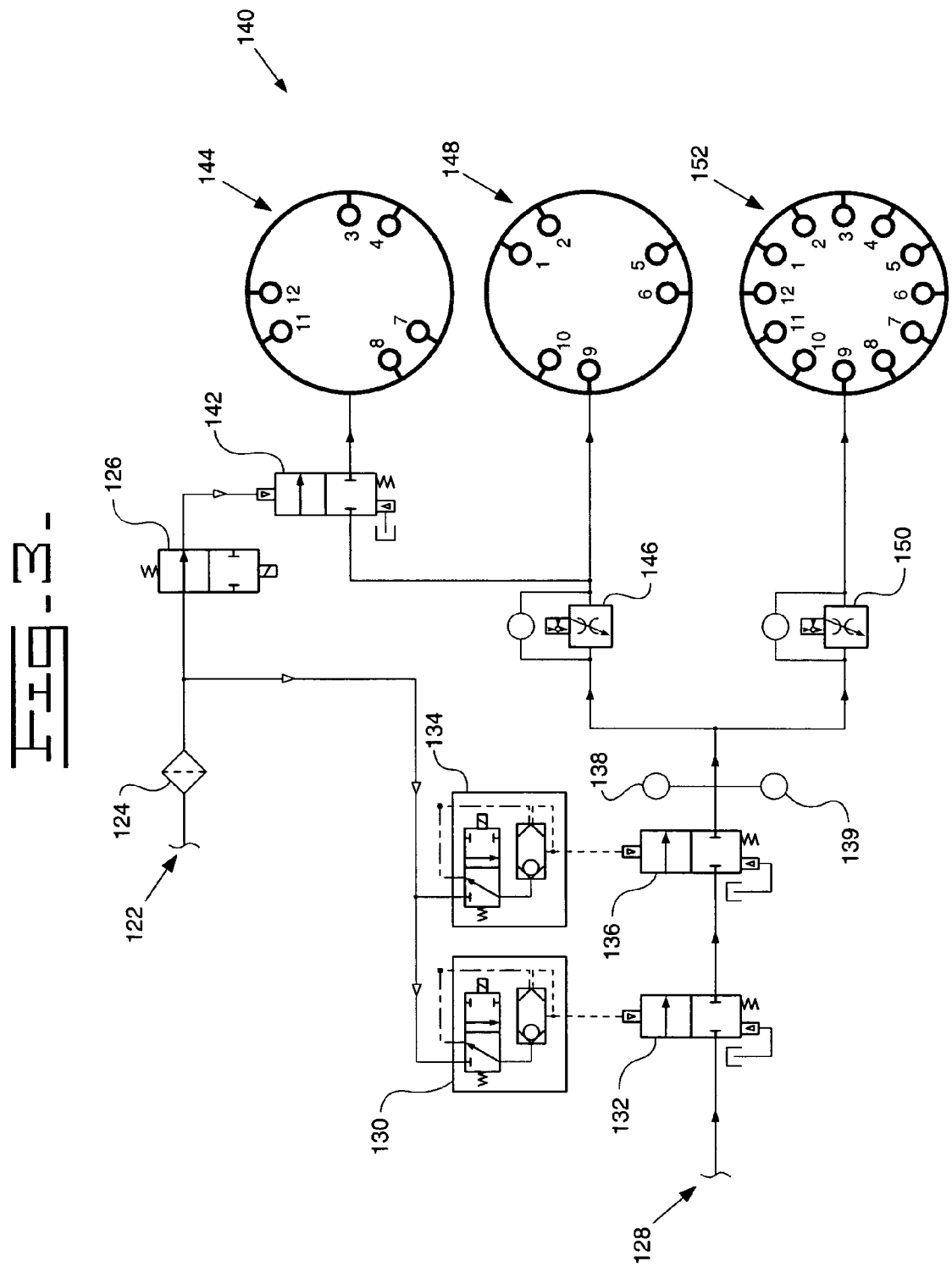
FIG. 3 illustrates a control circuit for controlling pilot fuel.

Referring now to FIG. 3, a control circuit for controlling pilot fuel is shown. The illustrated control circuit has an air supply 122 and a gas fuel supply 128. The air supply 122 may feed intermittent pilot shutoff valve solenoid 126 that may actuate an intermittent pilot shutoff valve 142 and primary and secondary gas fuel shutoff valve solenoids 130,134 that may actuate primary and secondary gas fuel shutoff valves 132,136. The shutoff valves 126,132,136 in conjunction with the pilot fuel control valve 146 and the main fuel control valve 150 may control fuel delivery to the manifold 140.

The manifold 140 may be comprised of three independent manifold sections: an intermittent pilot manifold 144 and a continuous pilot manifold 148 for supplying pilot fuel and a continuous main manifold 152 for supplying main fuel. Each manifold section 144,148,152 may incorporate its own independent fuel inlet feeding the fuel injectors (illustrated in this embodiment by orifices labeled 1-12 within each manifold section 144,148,152). In the illustrated embodiment, the shutoff valves 126,130,134 and control valves 146,150 may be operable to allow fuel to the fuel injectors or to deny fuel to the fuel injectors. The continuous pilot manifold 148 may supply pilot fuel to a first portion of the plurality of injectors (labeled 1,2,5,6,9,10), which may always be on. The intermittent pilot manifold 144 may supply pilot fuel to a second portion of the plurality of injectors (labeled 3,4,7,8,11,12), which may also be denied pilot fuel.

Although not shown, it is anticipated that the manifold 140 may comprise a variety of sections, each section being controllable to provide fuel to any one, or any number of fuel injectors.

Figure 4:
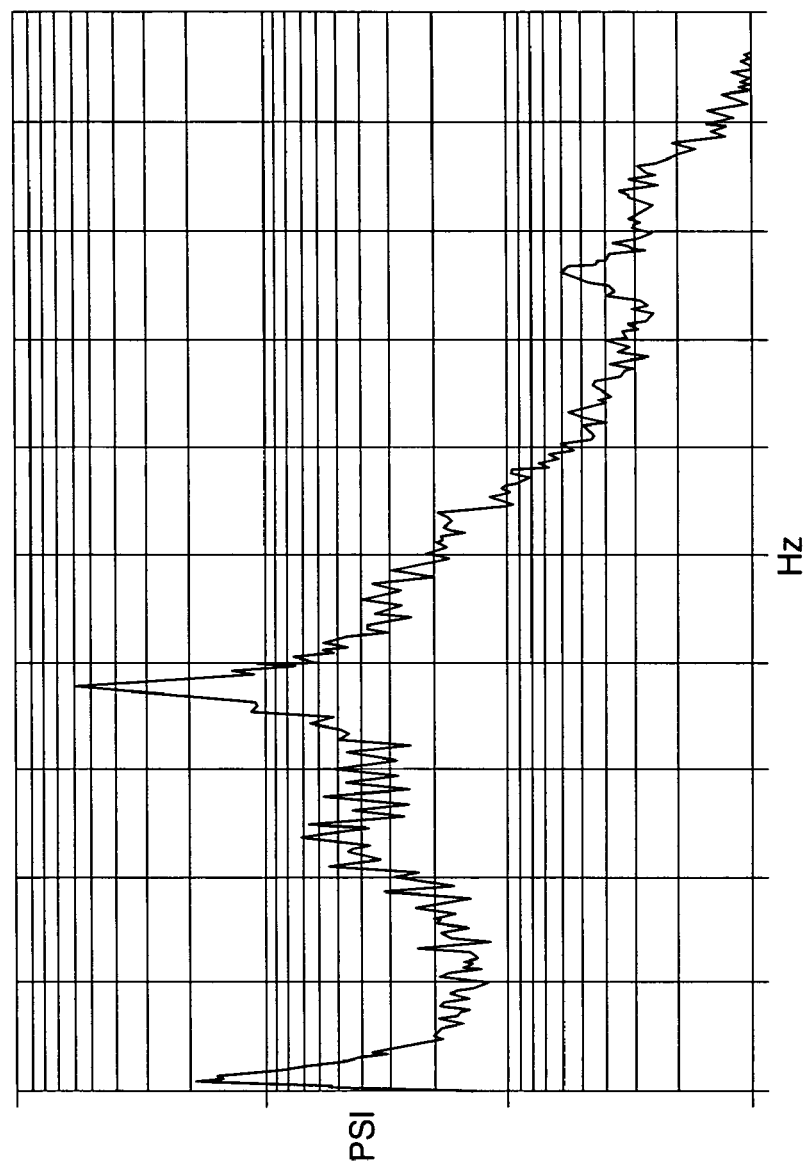
FIG. 4 illustrates a graph showing machine vibration of a gas turbine engine in normal operation under full load.
Figure 5:
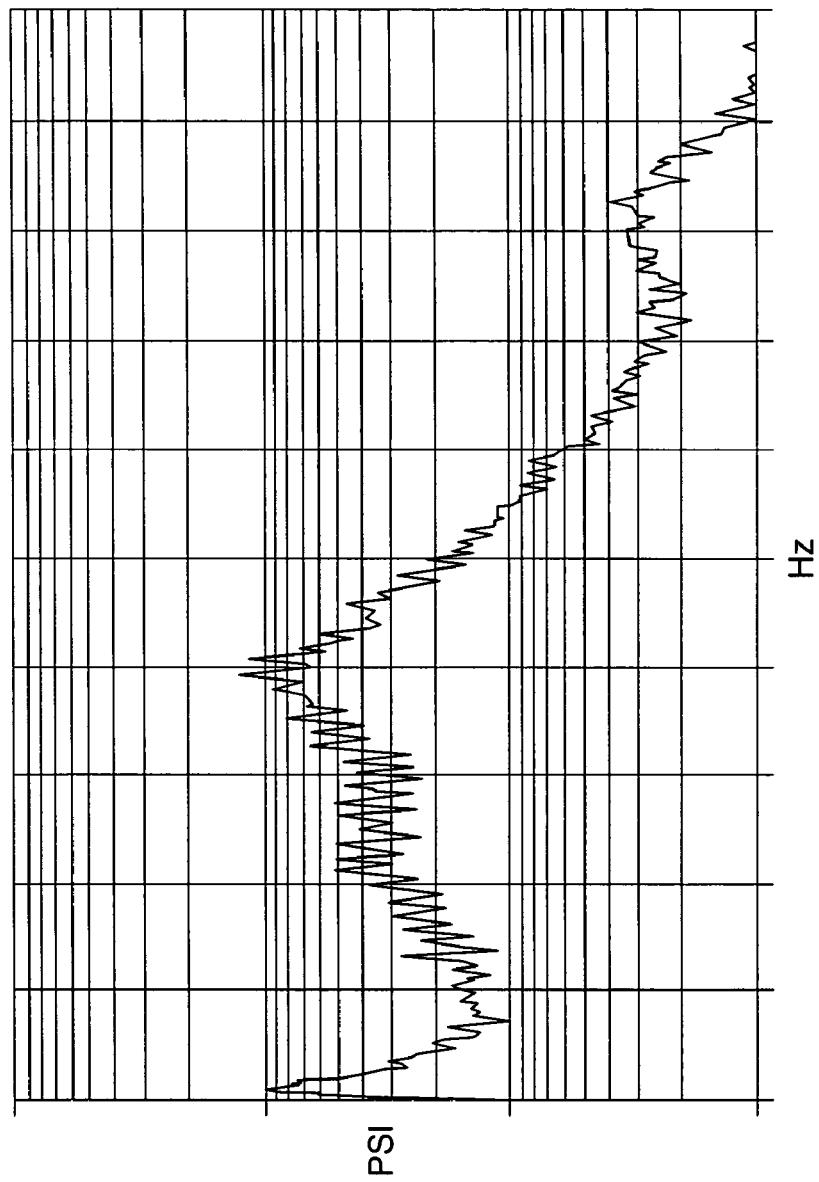
FIG. 5 illustrates a graph showing machine vibration of a gas turbine engine in operation with the present invention under full load.

FIGS. 4 and 5 illustrate graphs showing machine vibration of a gas turbine engine and show the oscillation amplitude for frequencies between 0 to 1000 Hz under full loads. FIG. 4 shows the oscillation amplitude without the benefit of the present disclosure. FIG. 5 shows the oscillation amplitude after implementing the present disclosure.

Figure 6:
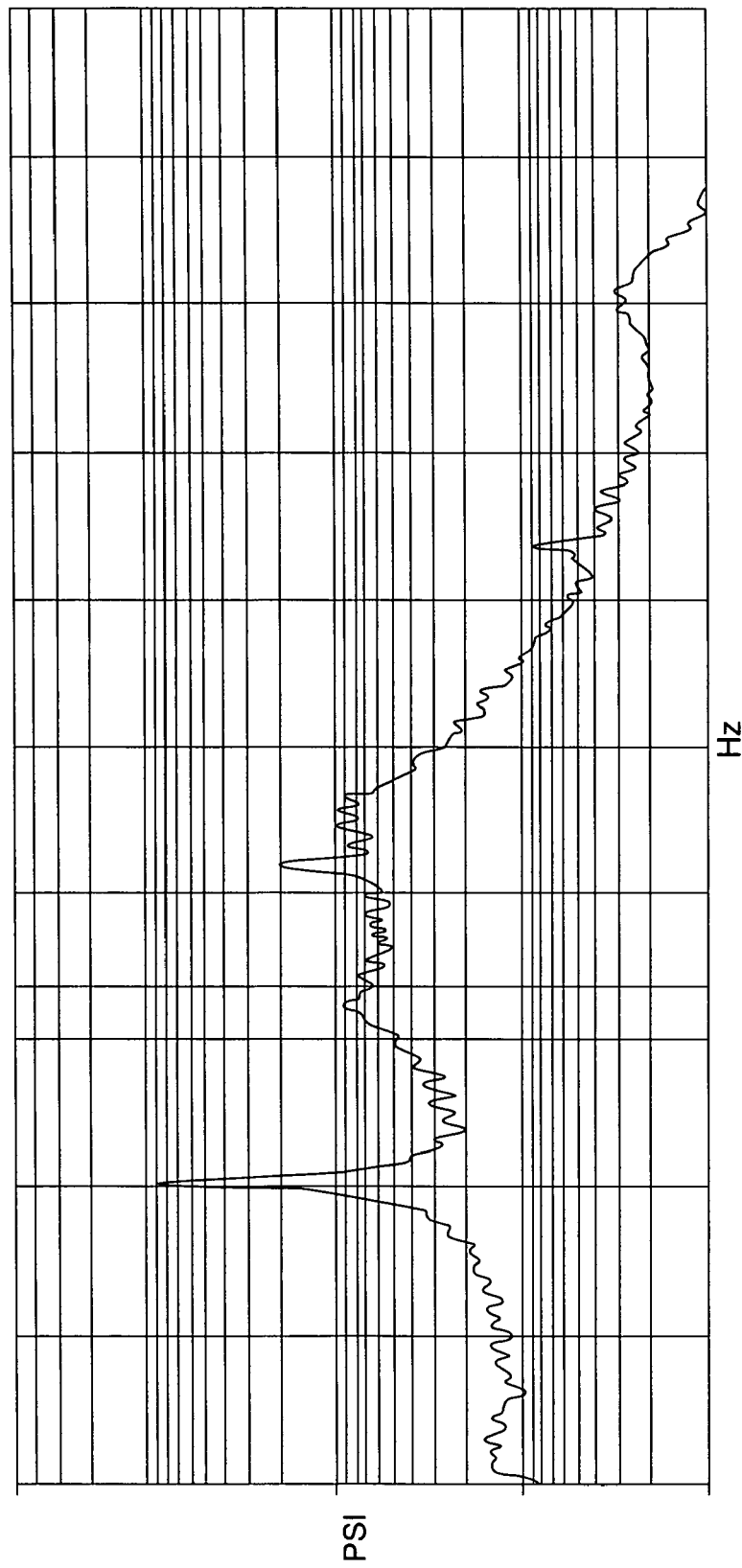
FIG. 6 illustrates a graph showing machine vibration of a gas turbine engine in without the present invention under part load.
Figure 7:
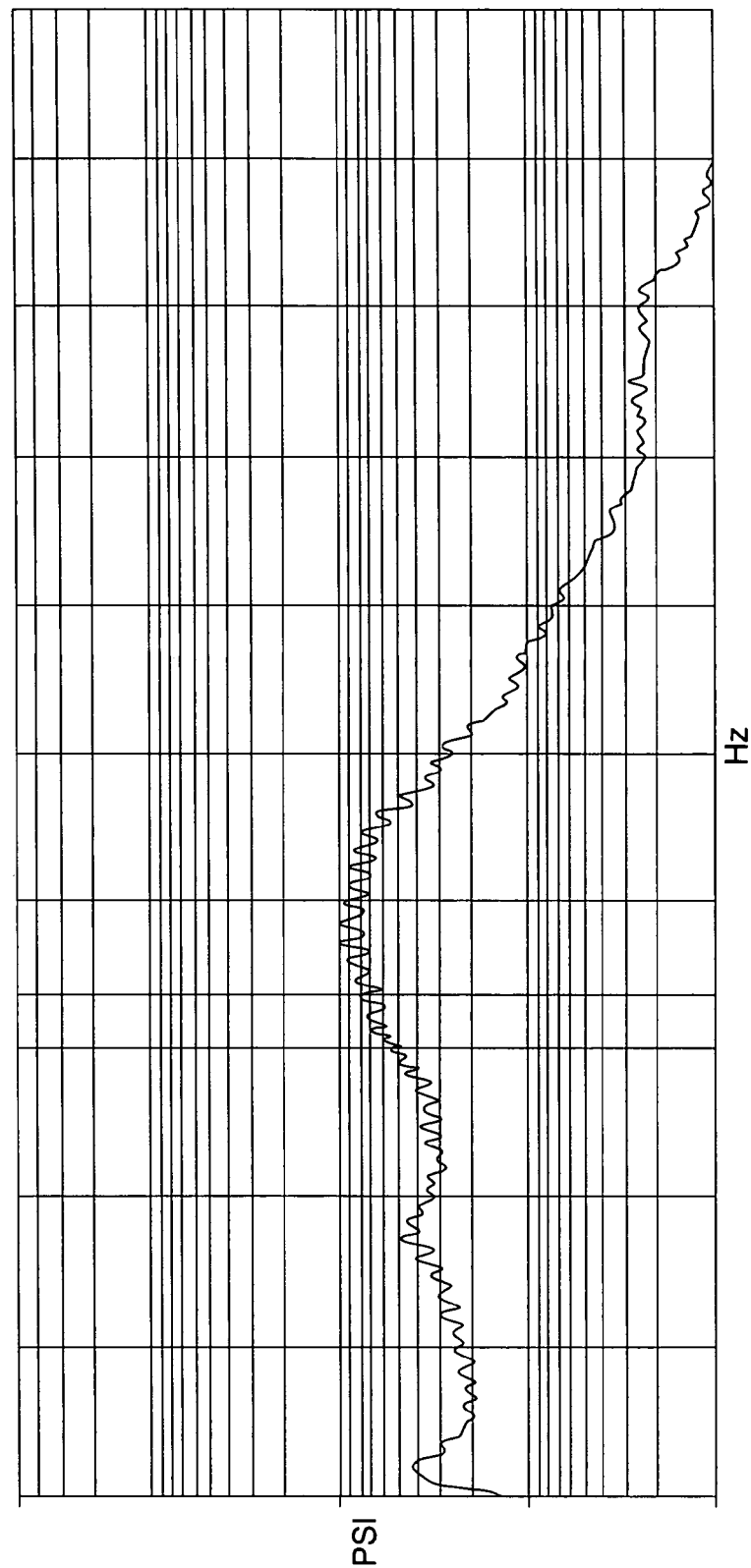
FIG. 7 illustrates a graph showing machine vibration of a gas turbine engine in operation with the present invention under part load.

FIGS. 6 and 7 illustrate graphs showing machine vibration of a gas turbine engine and show the oscillation amplitude for frequencies between 0 to 1000 Hz under part loads. FIG. 6 shows the oscillation amplitude without eh benefit of the present disclosure. FIG. 7 shows the oscillation amplitude after implementing the present disclosure.

The oscillation mode was identified using the wave equation in an annular space with non-damping boundary conditions and choked conditions at the turbine inlet defining the downstream end of the control volume. It was determined that creating a non-homogeneous temperature condition around parts of the circumference of the combustion primary combustion zone could be used to ensure that the acoustic velocity in the medium of the primary combustion zone was different than in other circumferential portions of the primary zone. Oscillations are transmitted at acoustic velocity, which is proportional to the square root of the temperature of the combustion gases in the primary combustion zone. Accordingly, creating circumferential zones of differing acoustic velocities would impose a time lag on the oscillation propagation, thus disrupting the period corresponding to the offending oscillation frequency.

INDUSTRIAL APPLICABILITY

In operation, fuel enters the main fuel line. Air actuated valves 142,132,136 allow the fuel to flow to the continuous main manifold 152, the continuous pilot manifold 148, and the intermittent pilot manifold 144. The amount of fuel may be controlled using variable or fixed orifices. Under normal operating conditions, fuel will continuously flow to the continuous main manifold 152, which supplies fuel into the premix duct 112 and into the annular combustion chamber 24.

When oscillations begin, a transducer (not shown) detects excessive amplitudes at the oscillating frequencies and communicates a representative signal to a control module. The control module may shut off fuel to the intermittent pilot manifold 144 and redirect the pilot fuel to the main fuel line. As a result, pilot fuel may only be fed to one-half of the total injectors, but the total fuel may remain substantially constant. The intermittent pilot manifold 144 may remain closed until the oscillations stop, or until the amplitude of the oscillation returns to an acceptable level.

The closing of pilot fuel to a portion of the fuel injectors 30 during operation creates a non-homogeneous temperature condition around parts of the circumference of the combustion primary combustion zone. The non-homogeneous conditions may result in different acoustic velocities in regions around the circumference between injectors with fueled pilot lines and injectors with non-fueled pilot lines. Accordingly, creating circumferential zones of differing acoustic velocities impose a time lag on the oscillation propagation, which attenuates the oscillations.

The pilot fuel of any of the fuel injectors 30 may be controlled through the manifold. It is envisioned that any number of sequences may be used to interrupt the oscillating frequency. For example, it is envisioned that the pilot line to only one fuel injector 30 may be closed, or a plurality of pilot lines may be closed. However, attenuation of all offending oscillation frequencies may be obtained by shutting off the fuel to the pilots of every other pair of fuel injectors 30 around the annular combustion chamber 24. For example, in the illustrated embodiment of FIG. 3, shutting off injector 3 and 4, 7 and 8, and 11 and 12 proved to eliminate oscillations. It is also envisioned that the oscillating frequency may be interrupted by increasing the fuel to the pilots of a portion of the plurality of injectors.

It is noted that the strategy of turning off the pilot fuel to the fuel injectors 30 may also be incorporated full time. In other words, the engine 10 may use all injectors with the pilot fuel lines active during start up to accelerate and bring the engine to a stable operational temperature, thus avoiding temperature distribution into the turbine hot section during the start up sequence, which would occur if only some pilot lines were fueled, especially since a large portion of the total fuel is apportioned to the pilot lines during start up. Post the start up sequence, the pilot lines of alternate pairs of injectors may be permanently turned off in response to any detected combustor oscillations. Fuel from the non-active injector pilot lines may be diverted to the main fuel supply.

It will be apparent to those skilled in the art that various modifications and variations can be made in the system and method of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A method of controlling combustion oscillations on a gas turbine engine, comprising:
    sending a quantity of fuel at a certain total flow rate through a plurality of injectors to be combusted the engine;
    determining an existence of a combustion oscillation; and
    controlling fuel to at least one of the plurality of injectors including routing fuel to a first portion of the plurality of injectors through a continuous pilot manifold, and routing fuel to a second portion of the plurality of injectors through an intermittent pilot manifold so that the flow rate of fuel through the at least one injector is modified, while maintaining the certain total flow rate of fuel through the plurality of injectors substantially constant.

2. The method as set forth in claim 1 further comprising, controlling at least one valve routing fuel to at least one of the continuous pilot manifold and the intermittent pilot manifold in reaction to the determination of the existence of combustion oscillations.

3. The method as set forth in claim 2 further comprising:
    controlling the at least one valve to decrease fuel to at least one of the continuous pilot manifold and the intermittent pilot manifold in reaction to the determination of the existence of combustion oscillations.

4. The method as set forth in claim 2, wherein the first and second portions of the plurality of injectors comprise alternating pairs of circumferentially adjacent injectors.

5. A method of operating a gas turbine engine comprising:
    supplying a flow of fuel to a main portion of a plurality of fuel injectors through a main manifold;
    supplying a flow of fuel to a pilot portion of the plurality of fuel injectors through a first pilot manifold and a second pilot manifold, the first pilot manifold supplying pilot fuel to a fraction of the plurality of fuel injectors, the second pilot manifold supplying the pilot fuel to the remainder of the plurality of fuel injectors; and, in response to the detection of combustion oscillation, redirecting a portion of the fuel flow from the first pilot manifold to the second pilot manifold, so that the overall flow rate of fuel to the pilot portion of the plurality of injectors remains substantially constant.

6. A method of operating a gas turbine engine according to claim 5 wherein:
    redirecting a portion of the fuel flow comprises operating a valve that is positioned between the first pilot manifold and the second pilot manifold.

7. A method of operating a gas turbine engine according to claim 5 wherein:
    supplying a flow of fuel to the pilot portion of the plurality of fuel injectors through a first pilot manifold and a second manifold further comprises supplying a flow of fuel to the pilot portion of multiple pairs of adjacent injectors through the first pilot manifold, and supplying a flow of fuel to the pilot portion of multiple pairs of adjacent injectors through the second pilot manifold.

* * * * *